(12) United States Patent
Samuelsen et al.

(10) Patent No.: US 10,076,142 B2
(45) Date of Patent: Sep. 18, 2018

(54) DURABLE REFLECTIVE SAFETY APPAREL WITH ACTIVE LASER ILLUMINATION

(71) Applicant: F.R.E.D. LLC, Marina Del Rey, CA (US)

(72) Inventors: Michael Samuelsen, Marina Del Rey, CA (US); Charlotte Tarantola, Marina Del Rey, CA (US)

(73) Assignee: F.R.E.D. LLC, Marina Del Rey, CA (US)

( * ) Notice: Subject to any disclaimer, the term of this patent is extended or adjusted under 35 U.S.C. 154(b) by 37 days.

(21) Appl. No.: 15/228,344

(22) Filed: Aug. 4, 2016

(65) Prior Publication Data

US 2017/0042260 A1    Feb. 16, 2017

Related U.S. Application Data

(60) Provisional application No. 62/204,629, filed on Aug. 13, 2015.

(51) Int. Cl.
| | |
|---|---|
| *A41D 13/01* | (2006.01) |
| *F21V 8/00* | (2006.01) |
| *F21V 33/00* | (2006.01) |
| *F21L 4/00* | (2006.01) |
| *A43B 3/00* | (2006.01) |
| *A42B 3/04* | (2006.01) |
| *F21V 1/00* | (2006.01) |

(52) U.S. Cl.
CPC .............. *A41D 13/01* (2013.01); *A43B 3/001* (2013.01); *F21L 4/00* (2013.01); *F21V 33/0008* (2013.01); *G02B 6/001* (2013.01); *G02B 6/0006* (2013.01); *A42B 3/044* (2013.01); *F21L 2001/00* (2013.01)

(58) Field of Classification Search
CPC ........ A41D 13/01; A42B 3/044; A42B 3/001; F21L 2001/00; F21L 4/00; F21V 33/0008; G02B 6/0006; G02B 6/001
USPC ................................. 362/103, 108, 582, 806
See application file for complete search history.

(56) References Cited

U.S. PATENT DOCUMENTS

| | | | | |
|---|---|---|---|---|
| 4,727,603 A | * | 3/1988 | Howard ............... | A41D 27/085 2/115 |
| 5,249,106 A | * | 9/1993 | Barnes .................. | G08B 5/004 362/103 |
| 5,424,922 A | * | 6/1995 | Wise ..................... | A41D 13/01 362/103 |
| 5,575,554 A | * | 11/1996 | Guritz ................. | A41D 27/085 362/103 |

(Continued)

*Primary Examiner* — Tsion Tumebo
(74) *Attorney, Agent, or Firm* — Los Angeles Patent Group; Arman Katiraei

(57) ABSTRACT

Some embodiments provide reflective safety apparel that combines passive illuminating elements with active illuminating elements for improved nighttime visibility. The active illuminating elements include a laser module coupled to flexible laser tubing. The laser module directs laser light into the flexible laser tubing. The laser tubing retains and transfers the laser light throughout its length even when bent. This flexibility allows the active illuminating elements to outline and conform to the shape of the passive illuminating elements. The laser tubing from different garments, such as a jacket and pants, can be coupled together. A single laser module can illuminate both garments as the laser light traverses the laser tubing of one garment to the other.

17 Claims, 7 Drawing Sheets

(56) References Cited

U.S. PATENT DOCUMENTS

| | | | | |
|---|---|---|---|---|
| 5,690,411 | A * | 11/1997 | Jackman | A41D 13/01 362/103 |
| 6,146,006 | A * | 11/2000 | Cross | A41D 13/01 362/103 |
| 6,243,870 | B1 * | 6/2001 | Graber | G06F 1/163 2/69 |
| 6,558,016 | B1 * | 5/2003 | Restauro | A41D 13/01 340/468 |
| 6,679,615 | B2 * | 1/2004 | Spearing | A41D 13/01 340/475 |
| 7,077,538 | B2 * | 7/2006 | Wooldridge | A41D 13/01 362/103 |
| D595,481 | S * | 7/2009 | Pressley | D2/841 |
| 7,690,049 | B2 * | 4/2010 | Golle | A41D 1/04 2/69 |
| 8,370,965 | B2 * | 2/2013 | Lin | B82Y 30/00 2/93 |
| 9,119,264 | B2 * | 8/2015 | Pulido, Jr. | H05B 33/0854 |
| 9,775,391 | B1 * | 10/2017 | Gonzalez | F21V 33/0008 |
| 2003/0213045 | A1 * | 11/2003 | Fuentes | A41D 13/01 2/69 |
| 2006/0028430 | A1 * | 2/2006 | Harary | A41D 1/002 345/156 |
| 2007/0199137 | A1 * | 8/2007 | Numes Ramos De Carvalho | A41D 1/002 2/458 |
| 2013/0077289 | A1 * | 3/2013 | Gridley | A41D 27/085 362/103 |
| 2013/0094189 | A1 * | 4/2013 | Kimitri | A41D 13/01 362/108 |

* cited by examiner

DURABLE REFLECTIVE SAFETY APPAREL WITH ACTIVE LASER ILLUMINATION

CLAIM OF BENEFIT TO RELATED APPLICATIONS

This application claims the benefit of U.S. provisional patent application 62/204,629 entitled "Reflective Safety Apparel With Active Laser Illumination" filed on Aug. 13, 2015. The contents of application 62/204,629 are hereby incorporated by reference.

TECHNICAL FIELD

The present invention pertains to safety apparel.

BACKGROUND

Safety apparel has many applications for those working or exposing themselves in high traffic areas or at night when visibility is poor. The primary utility provided by safety apparel is to improve the visibility of the safety apparel wearer. The improved visibility of the wearer allows others to take corrective action earlier, thereby reducing the danger risk that others pose to the wearer. Corrective action can include increasing distance or separation from the wearer or adjusting course so as to avoid coming into contact with the wearer.

Safety apparel is mostly seen on construction workers and motorcyclists. However, their use and application extends to emergency workers, sanitation workers, public transit workers, airport personnel (especially on-ground traffic controllers), government workers, dog walkers, motorists, runners, cyclists, pedestrians at night in poorly lit environments, etc. The apparel can come in the form of vests, jackets, hats, pants, gloves, shoes, or any other covering or clothing form.

Current safety apparel takes one of several different passive or active approaches to improve the wearer's visibility. A common passive approach involves manufacturing the garments with passive illuminating elements such as brightly colored (e.g., neon) or high contrast fabrics and materials. Other passive illuminating elements include reflective tape or reflective fabrics that are sewn into or onto the garment.

A shortcoming of these passive elements is the poor visibility afforded during nighttime applications. The passive illuminating elements require external light sources for illumination or reflection. The external light sources can include street lighting, construction lights, or lights of oncoming vehicles. Should the safety apparel wearer be positioned out of the external light, the apparel provides little to no illumination of the wearer. This is most hazardous when the external lighting is provided by passing vehicles. In some such cases, the wearer is not visible until in the direct line of sight of an oncoming vehicle.

To resolve many of these issues, some safety apparel incorporate active illuminating elements. Specifically, some safety apparel incorporate light emitting diodes (LEDs) and a power source (i.e., battery) into the garment. Although the active illuminating elements do little to improve day time visibility of the wearer, they provide illumination at night.

However, these active illuminating elements suffer shortcomings because of their poor durability and resiliency. In most cases, the garment cannot be washed without damaging the lighting elements and other electric wiring and circuitry powering the lighting elements. Any force or pressure placed on the lighting elements, wiring, or circuitry can also damage them. Yet, force and pressure are commonly exerted on garments used in the construction space, while motorists and outside workers often expose the garments to rain, snow, heat, or cold, any of which can damage LEDs or the circuitry and wiring powering the LEDs. There are also cost considerations as integrating LED lighting into wearable fabrics and providing a power source to the LED lighting increases the cost of such safety apparel relative to other safety apparel that rely only on passive illumination.

Accordingly, there is a need for safety apparel that retains the durability and resiliency of passively illuminated garments, but that also provides the improved nighttime visibility of actively illuminated garments. Stated differently, there is a need for safety apparel that provides active illumination at night while being able to withstand impact, forces, and pressures placed on the garment during construction applications and by outdoor uses in different climates and weather conditions.

BRIEF DESCRIPTION OF THE DRAWINGS

In order to achieve a better understanding of the nature of the present invention a preferred embodiment of the reflective safety apparel with active laser illumination will now be described, by way of example only, with reference to the accompanying drawings in which.

DETAILED DESCRIPTION

Some embodiments provide durable reflective safety apparel with active laser illumination. New and improved utility is realized by combining passive illuminating elements with active illuminating elements in a manner that retains the durability and resiliency of passively illuminated garments, while still providing the improved nighttime visibility of actively illuminated garments. In particular, the use of active laser illumination as part of the safety apparel provides active illuminating means that are durable, flexible, and able to withstand moisture, heat, cold, impact, pressure, and still be washed using conventional means without damaging the active illuminating elements of the garment.

Figure 1:
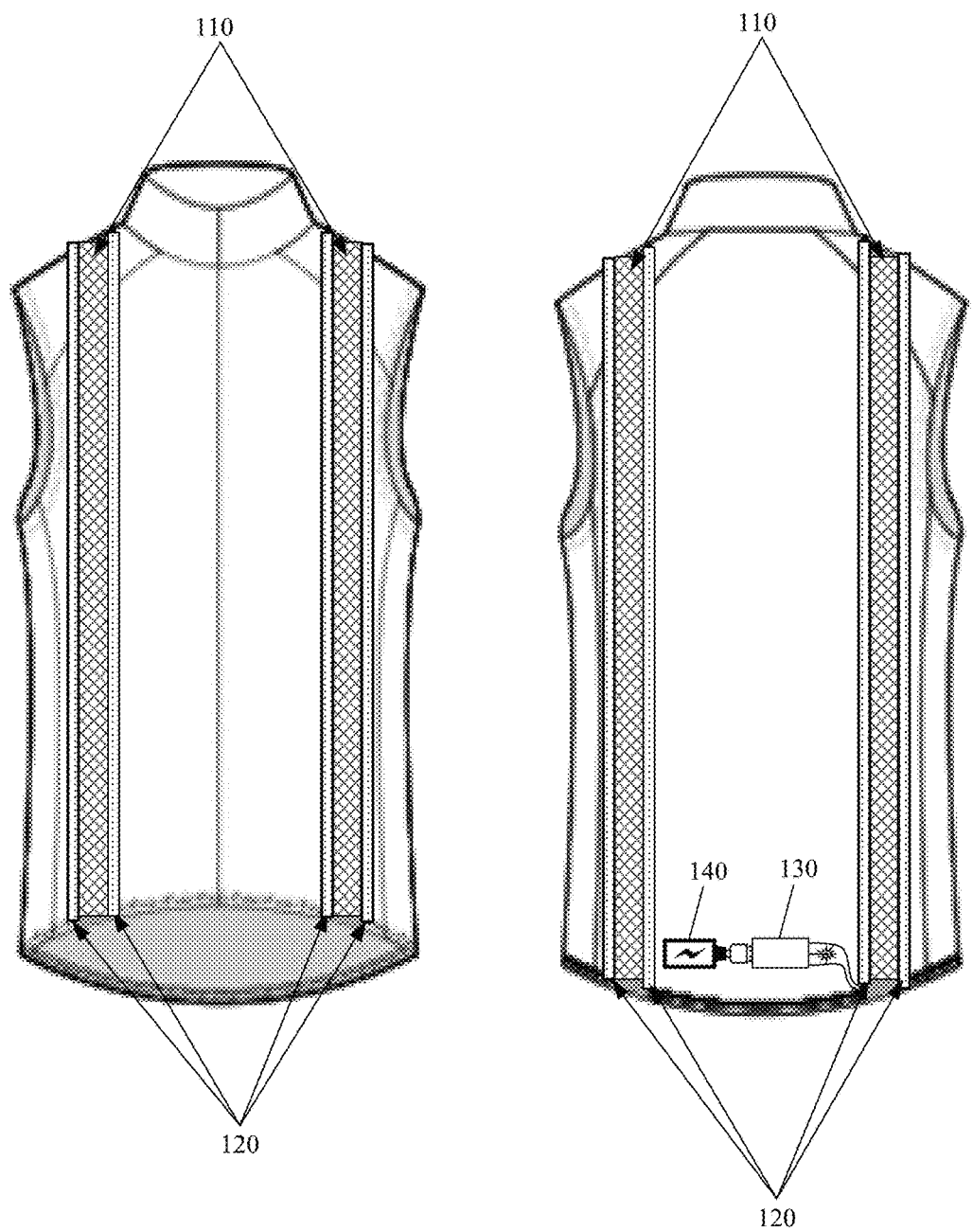
FIG. 1 illustrates a reflective safety vest with active laser illumination in accordance with some embodiments.

The durable reflective safety apparel with active laser illumination of some embodiments can take any of several forms including vests, jackets, hats, helmets, pants, gloves, shoes, and other coverings or clothing with active laser illumination. FIG. 1 illustrates a reflective safety vest with active laser illumination in accordance with some embodiments. The reflective safety vest with active laser illumination of FIG. 1 can have various dimensions, attributes, and sizes to accommodate different users and applications of the vest.

The safety vest of FIG. 1 includes passive illuminating elements 110, active illuminating elements 120, laser module 130, and power source 140. These same core components are also found in other forms (e.g., jackets, hats, helmets, etc.) of the durable reflective safety apparel with active laser illumination of some embodiments.

The passive illuminating elements 110 include reflective tape or other reflective material. The passive illuminating elements 110 provide high reflectance. In some embodiments, the reflectance is the result of mirror-like properties embedded in the material, iridescent materials, high contrast materials, or brightly colored materials. In some embodiments, the mirror-like properties are the byproduct of retroreflective glass beads, microprisms, or encapsulated lenses sealed onto the reflective tape or reflective material. The passive illuminating elements 110 meet certifications required for safety equipment. In some embodiments, the passive illuminating elements 110 adhere to various American National Standard Institute (ANSI) and International Safety Equipment Association (ISEA) certifications including high-visibility safety apparel certification ANSI/ISEA 107-2010.

Figure 2:
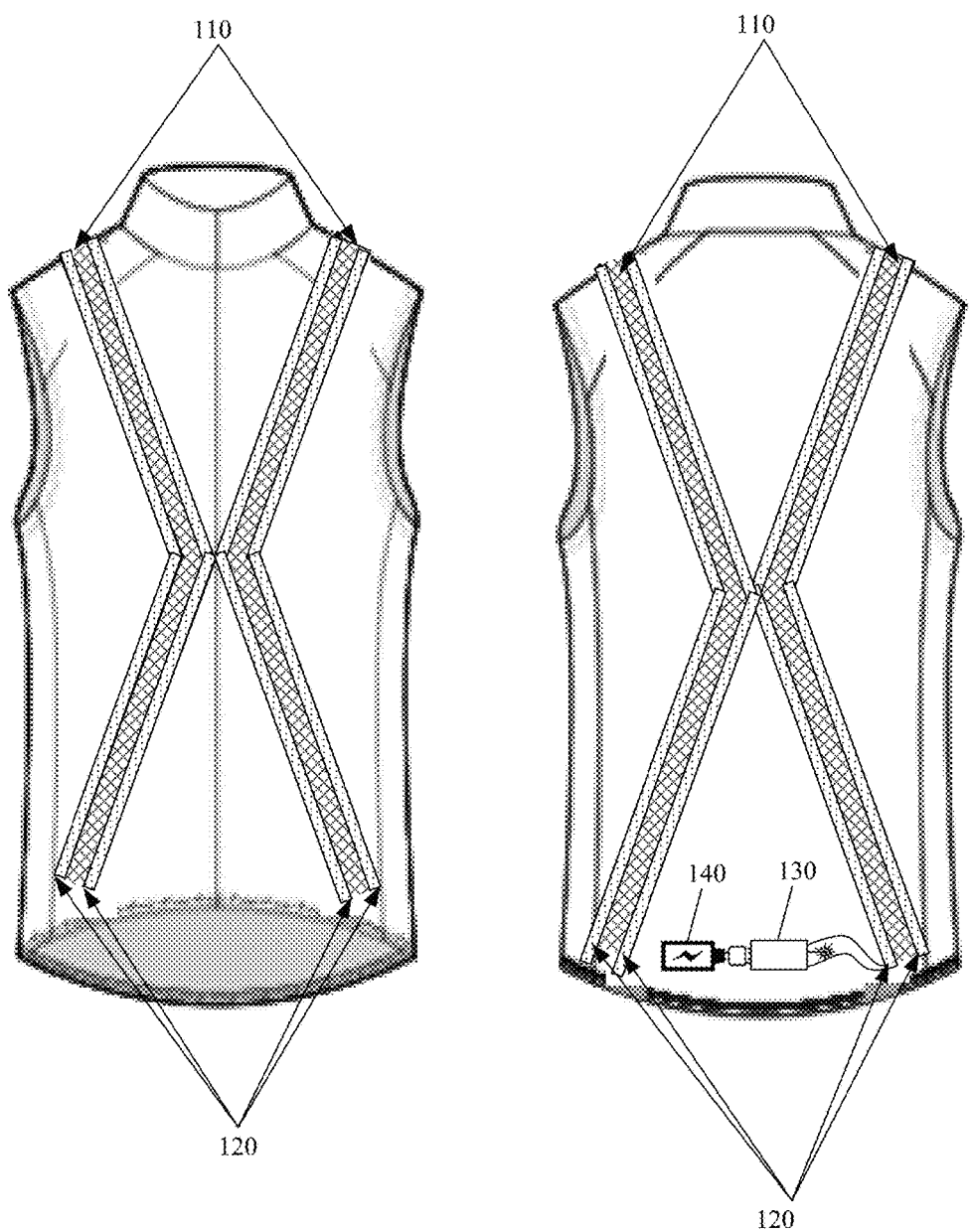
FIG. 2 illustrates an alternative configuration for the passive and active illuminating elements in accordance with some embodiments.

As shown in FIG. 1, the passive illuminating elements 110 are rectangular strips running vertically about shoulder width apart on the vest with the active illuminating elements 120 bordering or outlining the passive illuminating elements 110. This is one of many different possible configurations and placements for the passive illuminating elements 110 and the active illuminating elements 120. FIG. 2 illustrates an alternative configuration for the passive and active illuminating elements in accordance with some embodiments.

Figure 3:
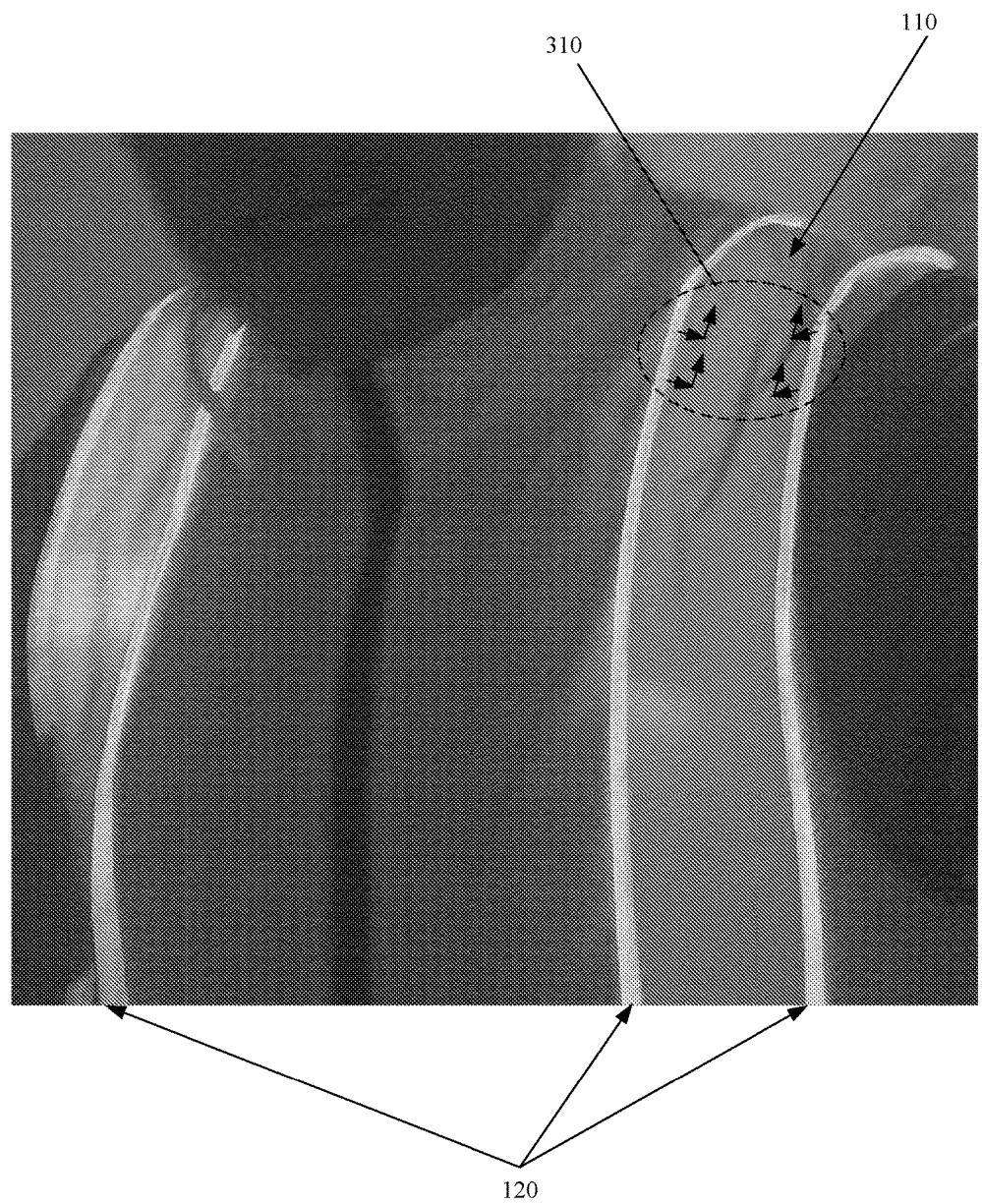
FIG. 3 illustrates the light emitted from the active illuminating elements reflecting off the outlined passive illuminating elements.

As noted above, the passive illuminating elements 110 provide poor or zero visibility and certainly no illumination for nighttime applications. Accordingly, the provided embodiments outline the edges of the passive illuminating elements 110 with the active illuminating elements 120. When powered on, the active illuminating elements 120 emit light. As shown in FIG. 3, the light emitted from the active illuminating elements 120 reflects off the outlined passive illuminating elements 110 (e.g., 310). This provides additional utility by creating an amplification effect, whereby the passive illuminating elements 110 become illuminated at night without the need for any other external light sources directed to the passive illuminating elements 110. As a result, a greater surface area of the garment is illuminated than if the passive illuminating elements 110 were removed or placed apart from the active illuminating elements 120. In fact, the passive illuminating elements 110 appear to have active illumination during nighttime usage when reflecting the light created by the juxtaposed active illuminating elements 120. The amplification effect and the reflected light cause the light being emitted from the active illuminating elements 120 to appear brighter than it is.

Figure 4:
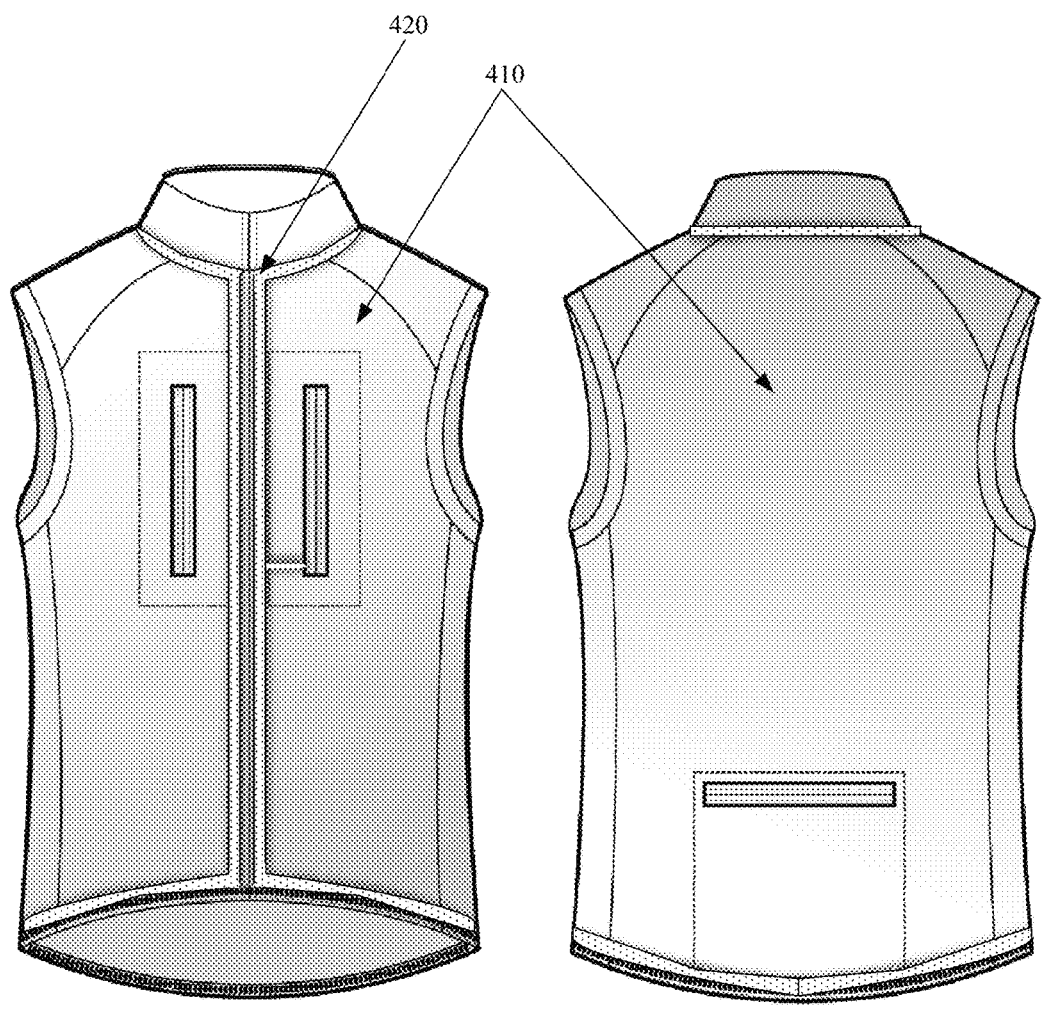
FIG. 4 illustrates safety apparel with an outer fabric layer of a passive illuminating material and active illuminating elements bordering or running about the seams of the passive illuminating material.

In some embodiments, the outer fabric of the garment or piece of safety apparel is almost entirely made of a passive illuminating material. FIG. 4 illustrates safety apparel with an outer fabric layer of a passive illuminating material 410 and active illuminating elements 420 bordering or running about the seams of the passive illuminating material. In this figure, the entire surface of the garment is reflective or passively illuminated. The active illuminating elements run around the collar, waist, and down the center of the garment. Additional active illuminating elements can be provided about the shoulders, sleeves, and sides to further illuminate the outline of the wearer. By increasing the surface reflectivity and embedding the active illuminating elements therewith, the visibility of the wearer greatly increases relative to safety apparel of the prior art.

In some embodiments and with reference back to FIG. 1, the active illuminating elements 120 include flexible laser tubing. The laser tubing flexibility allows the active illuminating elements 120 to outline and conform to the shape of the passive illuminating elements 110, the shape of the garment, or any custom shape. In some embodiments, the flexible laser tubing comprises laser wire surrounded by a transparent non-permeable membrane.

The laser wire is a thin transparent optical fiber within a polymer jacket. The optical fiber itself may be composed of optical glass. The optical fiber illuminates as a result of laser light passing through the laser wire. The optical fiber retains and transfers the laser light through the laser wire even when the laser wire is bent.

The transparent non-permeable membrane strengthens the laser wire providing for greater elasticity and durability. In some embodiments, the non-permeable membrane is a plastic or rubber based flexible, transparent, and durable encasing. The non-permeable membrane protects the laser wire from damage if force or pressure is applied thereon (e.g., stepped on). The non-permeable membrane imparts durability required for long-lasting operation of the active illuminating elements 120 in construction applications. In other words, the laser light will continue to illuminate through the laser tubing when forces or pressure are exerted thereon. The non-permeable membrane further permits exposure to heat, cold, and moisture without damage to the laser tubing or active illuminating elements 120. Accordingly, the safety apparel of the embodiments presented herein can be used in outdoor applications by motorists or construction workers and also washed with a regular clothes washing machine appliance when the power source has been removed. The active illuminating elements 120 function despite any such exposure. It should be noted that there are no electronics, electronic circuitry, or electric wiring in the laser tubing that can be damaged from impact or exposure to external elements. In fact, all such electronics, electronic circuitry, or electric wiring is housed within the laser module 130 which is sealed, impact resistant, and weather resistant. Moreover, as will be explained below, the laser module 130 and the power source 140 can be removed or replaced as needed.

The elasticity and durability afforded by the transparent non-permeable membrane allows the laser tubing to run as one continuous wire. As a result, the laser tubing can outline or border the passive illuminating elements 110 in order to achieve the configuration depicted in FIG. 1 or any other desired configuration. The elasticity also allows the laser wire to conform to the shape of the apparel and the wearer.

One continuous flexible laser tube is desired throughout the garment so that the active illumination of the laser wire and the garment as a whole can be achieved with a single source of laser light, such as the single laser module 130. Specifically, the laser light emitted from the single laser module 130 illuminates and passes through the entire length of the continuous laser tube with minimal to no attenuation of the laser light intensity through the entire length. Accordingly, preferred embodiments achieve full illumination by running one continuous flexible laser tubing throughout the garment.

In some embodiments, the amount of luminescence can be modified by changing the diameter of the laser tubing laser wire. The diameter can range between 5-20 millimeters, whereby increasing the thickness or diameter of the laser wire provides for greater luminescence.

Figure 5:
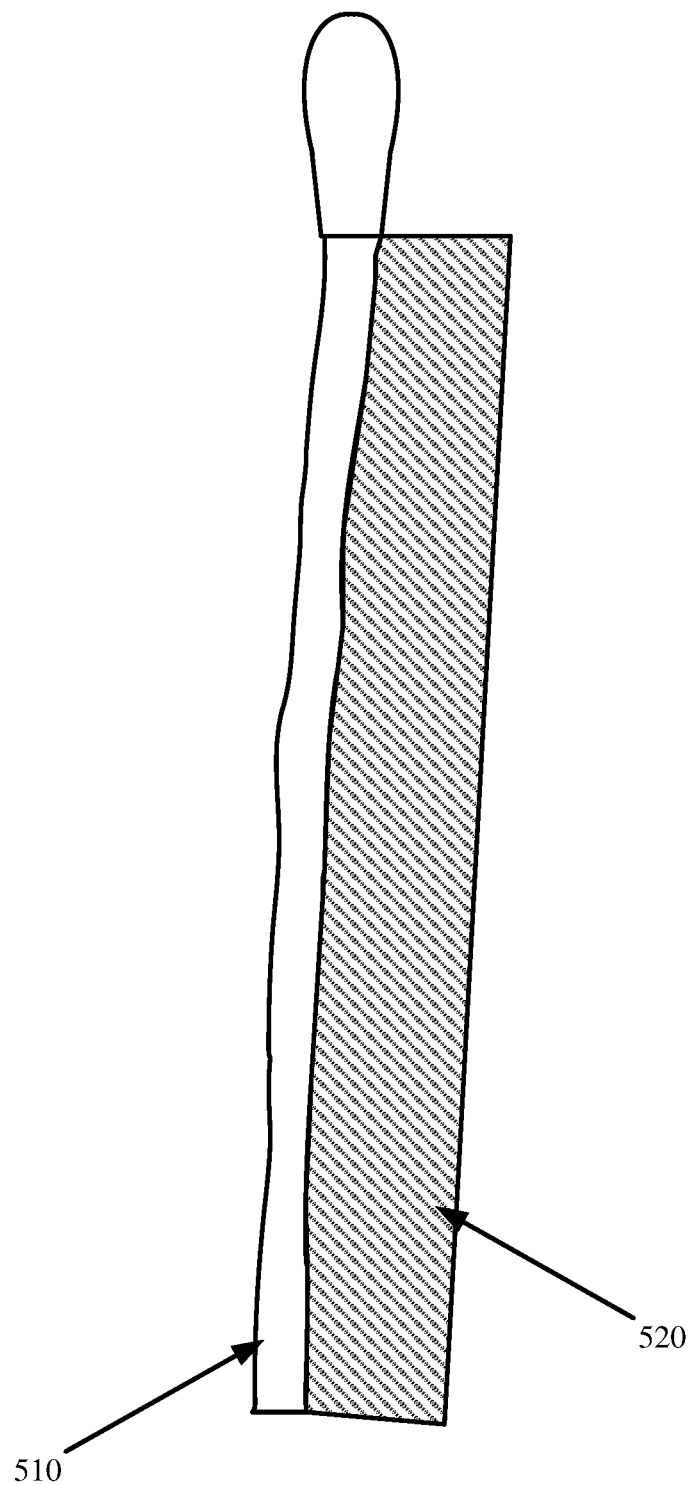
FIG. 5 depicts a portion of flexible laser tubing including the optical fiber and flap.

In some embodiments, the laser tubing is attached to the safety apparel by way of a flap or welting extending from at least one side of the tubing. FIG. 5 depicts a portion of flexible laser tubing with flap 520 extending from the non-permeable membrane 510 of the laser wire.

In some embodiments, the flap 520 is a flattened extension of the same non-permeable membrane material that encases the laser wire. In some other embodiments, the flap 520 is a different material that is adhered to or otherwise attached to the non-permeable membrane material. For instance, the flap 520 can be nylon, cloth, or other fabric, whereas the non-permeable membrane is plastic or rubber. The flap 520 may extend outwards from the non-permeable membrane by a few millimeters to a few centimeters. In constructing the vest of FIG. 1, the flap 520 is placed over an edge of the passive illuminating element 110 (i.e., an edge of reflective tape) and the two are stitched or sewn into the underlying garment, thereby affixing the position of the active and passive illuminating elements to the garment. Alternatively, the non-permeable membrane 510 may be juxtaposed to the passive illuminating element with the flap 520 positioned on the opposite side. The laser tubing can also be affixed with an adhesive or with anchors or a transparent sleeve that extend from the garment. The anchors can include spaced rings that extend from the garment. The laser tubing slides into the anchors or transparent sleeve.

Each end of the laser tubing is formed as a receiving end. In some embodiments, the receiving end comprises a hollowed tube extension serving as a receptacle. The receiving end can slide onto and couple with a flange of the laser module 130. This is one manner with which the flexible laser tubing can couple to the laser module 130. The coupling causes laser light emitted from the laser module 130 to be focused and directed into the receiving end. The laser light then refracts and passes through the laser wire or optical fiber of the laser tubing which causes the laser tubing to illuminate.

Other embodiments can employ a clamping mechanism, screw based mechanism, or other male-to-female coupling mechanism to secure the flexible laser tubing to the laser module 130. For instance, each receiving end of the laser tubing can comprise a threaded coupler for screwing onto a complimentary threaded end of the laser module.

When the laser module 130 is disconnected from the flexible laser tubing, the tubing interior can be protected by a plug or cap. Moreover, the opposite receiving end of the laser tubing (not coupled to the laser module 130) can be capped to prevent the passing laser light from exiting out the laser tubing.

As will be described further below, the opposite receiving end of a first length of laser tubing (not coupled to the laser module) could be coupled to the receiving end of a separate second length of laser tubing, wherein the second length of laser tubing can be embedded in the same or different apparel as the first length of laser tubing. This allows for laser tubing of different garments to be chained together so that laser light from a single laser module 130 passes through and illuminates both lengths of laser tubing. In this manner, a single laser module 130 can be used to actively illuminate two or more garments with connected laser tubing.

In some embodiments, the laser module 130 is integrated into the garment. For example, the laser module 130 is sewn into the garment. In such cases, the flexible laser tubing is run adjacent to the laser module 130 and a waterproof and impact resistant laser module 130 is provided.

In some embodiments, the laser module 130 is designed to be replaceable. In some such embodiments, the laser module 130 can be inserted and removed from the garment as needed. For instance, the laser module 130 would be removed and the flexible laser tubing sealed with an end plug or cap when washing the garment. The laser module 130 could then be reinserted into the pouch and recoupled to the flexible laser tubing prior to use. The ability to replace or swap out the laser module 130 also allows for various customizations of the safety apparel. For instance, the safety apparel can be customized to actively illuminate with a red color by coupling to a first laser module emitting red laser light and to actively illuminate with a blue color by coupling to a different second laser module emitting blue laser light. Some such embodiments provide a secure pouch to hold the laser module 130 within the garment. The pouch can be a pocket slightly greater in size than the laser module. Velcro or other means can be used to secure the laser module within the pouch.

In some embodiments, the laser module 130 is positioned off the garment. In some such embodiments, the flexible laser tubing extends several inches from the garment to allow the laser wire to connect to the laser module 130 wherever it is located. For example, a motorcycle or bicycle rider may couple the laser module to the helmet and connect the flexible laser tubing from the garment to the laser module on the helmet. Similarly, the laser module can be placed on the motorcycle or bicycle frame to reduce load on the rider.

As noted above, the receiving end or the flexible laser tube extension can also be used to couple the laser tubing of multiple garments together. In this manner, the user can chain and connect different laser tubing from the same or different garments to form one continuous laser tube and illuminate all connected laser tubing with a single laser module, rather than have each separate laser tube connected to and illuminated by a different laser module. For example, a user can connect one receiving end of first laser tubing from a helmet to a receiving end of second laser tubing of a jacket. The user can then connect the opposite receiving end of the second laser tubing to the receiving end of third laser tubing of pants with the opposite receiving end of the third laser tubing being coupled to a single laser module. The laser module emits laser light that refracts and passes through the connected third, second, and first laser tubings illuminating each of the pants, jacket, and helmet as a result.

Figure 6:
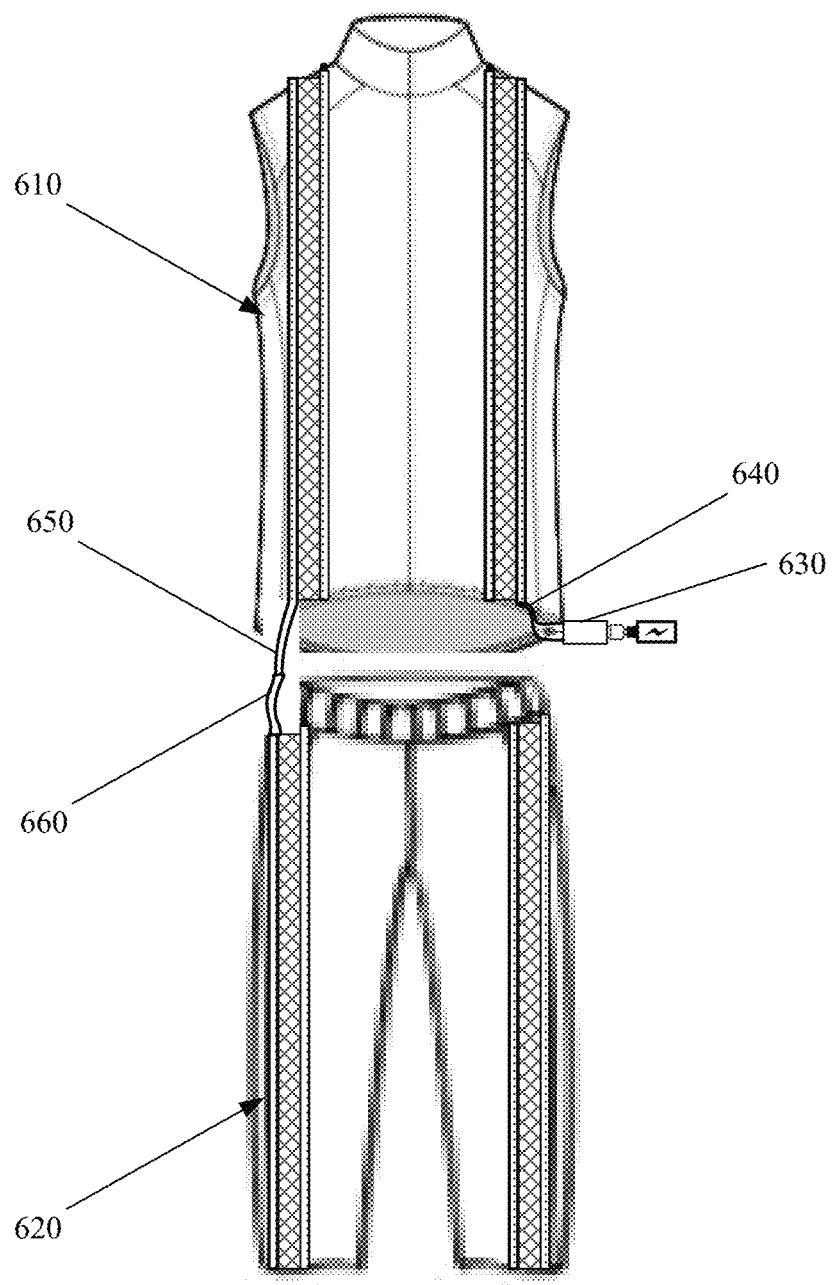
FIG. 6 illustrates coupling the flexible laser tubing of a jacket top with the flexible laser tubing of pants bottom so that the two garments can be illuminated with a single laser module.

FIG. 6 illustrates coupling the flexible laser tubing of a jacket 610 with the flexible laser tubing of pants 620 so that the two garments can be illuminated with a single laser module. Specifically, the user couples the laser module 630 to one receiving end 640 of the flexible laser tubing of the jacket 610. The flexible laser tubing runs continuously throughout the jacket 610 until the opposite receiving end 650 is exposed at the jacket 610 opposite side. This other receiving end 650 is then coupled to one end 660 of the pants 620 flexible laser tubing. Once connected, the laser module 630 emitted light passes through and illuminates the flexible laser tubing of the jacket 610 and also the flexible laser tubing of the pants 620 as if the laser wire from the two separate flexible laser tubes of the two separate garments 610 and 620 were one continuous tube.

The laser tubing connectivity improves wearability and convenience. Depending on the application and comfort level, users can select where the laser module is housed. The safety apparel becomes lighter relative to other actively illuminated safety apparel because the laser module and power source comprising the bulk of the active illumination can be left off the garments. For example, a motorcyclist can place the laser module and power source on his motorcycle and connect the safety apparel to the laser module when riding. When not riding, the motorcyclist can continue to wear the safety apparel while the laser module and power source remains on the motorcycle.

Individual garments can be sold without the expense of the laser module and power source. The user purchases a single laser module and power source and can actively illuminate several disparate but connected safety apparel with just the single laser module and power user. The connectivity further allows users to reuse the safety apparel even when the laser module fails. The user simply swaps the defective laser module with a working laser module. If the active illuminating elements, such as LEDs, were integrated as part of the safety apparel, a failure of one or more of these integrated elements could render the safety apparel as a whole unusable.

Figure 7:
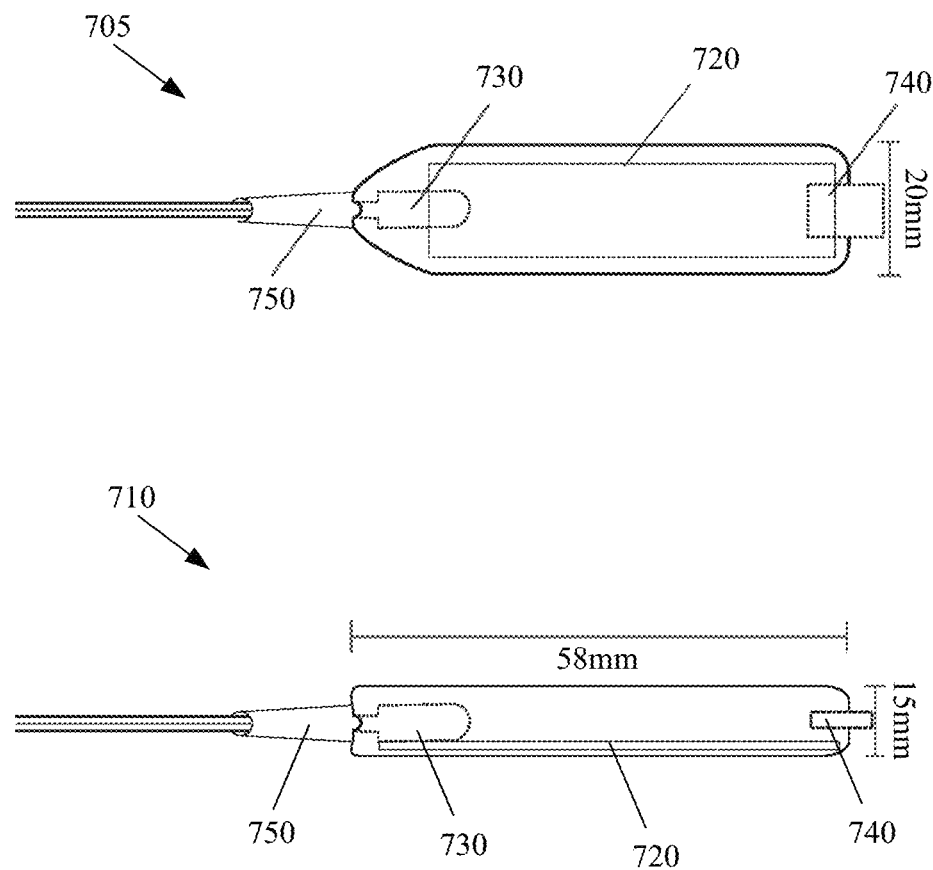
FIG. 7 provides a front section cut view and top view of the laser module.

The laser module is a portable, compact, and low power lighting element. FIG. 7 illustrates the laser module in accordance with some embodiments. FIG. 7 provides a front section cut view 705 and top view 710 of the laser module.

Housed within the laser module is a compact laser driver circuit board 720 with a driver that provides current to a laser diode 730. The laser diode 730 produces a laser that emits light of a particular wavelength. Depending on the desired intensity of the emitted light and length of the laser wire, laser modules operating in the ten to fifty milliamp ranges can be used to provide the active illumination. As shown, the circuit board 720 includes an adapter 740 for coupling the laser module to a power source. In some embodiments, the adapter 740 is a Universal Serial Bus (USB) connector. In some embodiments, the laser module receives a five volt direct current from the power source and outputs a 30 milliwatt laser for illumination. The resulting illumination of the laser wire can vary around 1,100 candelas per meter.

The laser module is depicted to have a length of 58 millimeters (mm), a height of 15 mm, and a width of 20 mm. However, laser modules of different sizes, shapes, and proportions can be used to provide the active illumination of the laser wire.

The laser module of FIG. 7 also includes a sleeve 750 to receive the laser wire and guide in coupling the laser wire with the laser module. The sleeve 750 also provides strain relief to prevent excess bending of the laser wire at the point of coupling with the laser module.

In preferred embodiments, the laser module illuminates the flexible laser tubing with coloring that is visible during day and night. A laser module emitting red light adheres with these preferred embodiments. Red light is preferred not only because of its daytime and nighttime visibility, but also because it is the most energy efficient laser color to produce. Red light has a larger wavelength and smaller frequency than yellow, green, or blue light.

The laser module includes at least an on and off toggle to allow the user to activate and deactivate the laser light. In some embodiments, the laser module includes settings with which a user can customize the intensity of the emitted light. Such settings allow the user to increase or decrease brightness as desired. In some embodiments, the laser module includes a setting with which the user can change how the module emits light. A first setting can cause the module to emit a constant light, a second setting can be used to pulse the light and create a flashing effect, and a third setting can gradually increase and decrease the laser light intensity, for example from zero milliamps to thirty milliamps before ramping back down to zero milliamps. These lighting effects improve visibility of the wearer by creating a visual change that is more noticeable by others. A setting can also change the color of the laser light by changing the frequency of the emitted laser.

The laser module requires a power source (see reference marker 140 from FIG. 1). The power source may include rechargeable batteries that are integrated within the laser module housing. The power source can also include batteries in a separate housing. As noted above, connectors, such as USB connectors, can connect the power source to the laser module and provide the power the laser module needs to generate the laser light. Such connectivity also allows the power source to be replaced as needed or removed when washing the garment.

Batteries of different sizes can be used for the power source depending on the application. A battery capacity of 440 milli-ampere hours (mAh) is estimated to provide four hours of continuous illumination and a battery capacity of 3000 mAh is estimated to provide twenty seven hours of continuous illumination. A battery capacity of 110 mAh can also be used in applications where a smaller battery is sufficient.

Instead of a separate battery, some embodiments allow the laser module to be connected to a user's smartphone. Smartphone batteries range anywhere from 1000 to 3000 mAh and will likely only increase over time. In some such embodiments, a user connects one end of a USB cable to a smartphone and the other end to the laser module which is connected to the garment's flexible laser tubing. This can ensure that the user always has a backup power source to use in powering the laser module. Other power sources can also be used. For example, the laser module may derive power directly from a motorcycle's battery or onboard electronics or derive power from a user peddling a bicycle.

Some embodiments incorporate a Global Positioning System (GPS) transmitter or cellular transmitter into the reflective safety apparel with active laser illumination. The transmitter derives power from the laser module power source or other power source. The transmitter periodically transmits the location or coordinates of the user. Software applications or specialized tracking equipment receive the location information and can track movements of the user using the location information. This improves safety by providing secondary means with which to identify a user's location. This is helpful when an obstruction blocks the line of sight and the user cannot be visibly identified. The location information can also be received by autonomous robots that avoid coming into contact with the user as a result of the transmitted location information.

Some embodiments incorporate solar panels throughout the garment. The solar panels may be connected to rechargeable batteries also contained within the garment. The solar panels generate power used to power the laser module.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A wearable safety garment comprising:
a passive illuminating element;

a laser illuminated element bordering said passive illuminating element and spanning from a first end continuously and devoid of electronics, light sources, or electrical wiring, across at least one full length of the wearable safety garment to an opposite second end, the laser illuminated element comprising a laser wire formed from a transparent optical fiber extending continuously from the first end to the second end, the laser wire illuminating in response to laser light refracting and passing through the laser wire;

a detachable laser module decoupling from and coupling to the first end of the laser illuminated element, the detachable laser module comprising a laser diode emitting said laser light directly into the first end through the full length to the second end of the laser illuminated element, wherein the detachable laser module provides a single source of illumination that illuminates the full length of the wearable safety garment based on the laser light refracting within the laser wire while passing through the laser wire; and a power source powering the laser module.

2. The wearable safety garment of claim 1, wherein the passive illuminating element comprises one of reflective tape, reflective materials, iridescent materials, or brightly colored materials.

3. The wearable safety garment of claim 1, wherein the laser illuminated element further comprises a flexible, transparent, and non-permeable circular membrane surrounding the laser wire.

4. The wearable safety garment of claim 3, wherein the laser illuminated element further comprises a flap extending from said membrane with stitching coupling the laser illuminated element to the wearable safety garment along a border of the passive illuminating element.

5. The wearable safety garment of claim 1, wherein the passive illuminating element amplifies illumination of the laser illuminated element by reflecting light from the laser illuminated element away from the wearable safety garment.

6. The wearable safety garment of claim 1, wherein said laser module comprises a flange and the laser illuminated element comprises a hollowed tube extension, wherein the flange couples to the hollowed tube extension and directs said laser light onto the laser wire.

7. The wearable safety garment of claim 1 further comprising a resealable pouch securing a position of the laser module about the wearable safety garment.

8. The wearable safety garment of claim 1, wherein the first end of the laser illuminated element couples to the laser module and the second end couples to a second laser illuminated element of a different second wearable safety garment, wherein said coupling to the second laser illuminated element transfers the laser light refracting and passing through the laser wire of the laser illuminated element to laser wire of the second laser illuminated element of the different second wearable safety garment.

9. The wearable safety garment of claim 1, wherein the laser illuminated element comprises a single continuous tube bordering left and right sides of the passive illuminating element.

10. The wearable safety garment of claim 1, wherein the power source is configured to decouple from the laser module.

11. The wearable safety garment of claim 1 further comprising a sleeve spanning adjacent to the passive illuminating element, wherein the sleeve secures the laser illuminated element to the wearable safety garment by insertion of the laser illuminated element in said sleeve.

12. The wearable safety garment of claim 1, wherein the laser module and power source are located off the wearable safety garment, and wherein the power source couples to the laser module and the laser module couples to the wearable safety garment via coupling to the laser illuminated element extending from the wearable safety garment.

13. Safety apparel comprising:

a detachable laser module comprising a flange and a diode emitting laser light through said flange;

a first wearable garment with first laser tubing, devoid of electronics, light sources, or electrical wiring, spanning from one end to an opposite end of the first wearable garment, the first laser tubing comprising a first receptacle at a first end, a second receptacle at an opposite second end of the first laser tubing, and a first transparent optical fiber extending continuously from the first receptacle to the second receptacle of the first laser tubing, the first laser tubing first receptacle attaching to and detaching from said flange of the detachable laser module with the first transparent optical fiber refracting the laser light from the diode of the detachable laser module across an entire length of the first transparent optical fiber extending continuously from the first receptacle to the second receptacle; and a second wearable garment with second laser tubing, devoid of electronics, light sources, or electrical wiring, spanning from one end to an opposite end of the second wearable garment, the second laser tubing comprising a first receptacle at a first end, a second receptacle at an opposite second end of the second laser tubing, and a second transparent optical fiber extending continuously from the first receptacle to the second receptacle of the second laser tubing, the second laser tubing first receptacle coupling to the first laser tubing second receptacle and directing the laser light refracting through the first transparent optical fiber into said second transparent optical fiber, wherein the laser light from the laser module is a single light source illuminating the first laser tubing of the first wearable garment and the second laser tubing of the second wearable garment.

14. The safety apparel of claim 13, wherein the first wearable garment and the second wearable garment comprise any two of a vest, hat, helmet, glove, jacket, pants, and shoe.

15. The safety apparel of claim 13, wherein the first wearable garment comprises a passive illuminating element reflecting light from the first laser tubing, wherein the first laser tubing borders the passive illuminating element.

16. The safety apparel of claim 13, wherein the laser module decouples from the first laser tubing first receptacle and couples to the second laser tubing second receptacle.

17. The safety apparel of claim 13, wherein the laser module is a first laser module, the safety apparel further comprising a second laser module interchangeably coupling to the first laser tubing first receptacle with the first laser module, the second laser module emitting a different laser light than the first laser light and changing illumination of the first laser tubing relative to the first laser module laser light.

* * * * *